United States Patent [19]

Senda et al.

[11] Patent Number: 5,118,456
[45] Date of Patent: Jun. 2, 1992

[54] PROCESS FOR PREPARING PRE-EXPANDED PARTICLES OF POLYOLEFIN RESIN

[75] Inventors: Kenichi Senda, Hirakata; Takamasa Imai, Kobe; Tetsuya Ogita, Takasago, all of Japan

[73] Assignee: Kanegafuchi Kagaku Kogyo Kabushiki Kaisha, Osaki, Japan

[21] Appl. No.: 456,398

[22] Filed: Dec. 26, 1989

[30] Foreign Application Priority Data

Dec. 27, 1988 [JP] Japan .................. 1-334978

[51] Int. Cl.⁵ .............................................. B29C 67/22
[52] U.S. Cl. .................................... 264/51; 264/140
[58] Field of Search ......................... 264/53, 140, 51

[56] References Cited

U.S. PATENT DOCUMENTS 3,542,715 11/1970 White et al. .......................... 264/41
4,054,625 10/1977 Kozlowski et al. ................. 264/140
4,694,026 9/1987 Park ...................................... 264/53
4,694,027 9/1987 Park ...................................... 264/53

FOREIGN PATENT DOCUMENTS 229882 7/1987 European Pat. Off. .

OTHER PUBLICATIONS

Chemical Abstracts, vol. 87, No. 2, 1977, Abstract No. 6966n.

Primary Examiner—Jay H. Woo
Assistant Examiner—W. J. Matney, Jr.
Attorney, Agent, or Firm—Armstrong & Kubovcik

[57] ABSTRACT

An improved process for preparing pre-expanded particles of a polyolefin resin, wherein polyolefin resin particles are dispersed in water in a pressure vessel, the particles are impregnated with a volatile blowing agent which is butane containing not less than 70 percent by weight of isobutane, the temperature of the mixture of particles in water is elevated to a temperature close to the melting point of the particles under a pressure equal to or higher than the vapor pressure of the blowing agent, and the mixture is released into a low pressure zone. The obtained pre-expanded particles are not fused together or adhered to each other, and are not shrunken. Environmental damage, such as destruction of the ozone layer, is avoided since fluorochlorocarbon is not used as a blowing agent.

5 Claims, No Drawings

PROCESS FOR PREPARING PRE-EXPANDED PARTICLES OF POLYOLEFIN RESIN

BACKGROUND OF THE INVENTION

The present invention relates to a process for preparing pre-expanded particles of a polyolefin resin. More particularly, the invention relates to a process for preparing pre-expanded polyolefin resin particles which are applicable to a process for producing foams by heating pre-expanded particles with a heating medium such as steam in a mold which is able to be closed but unable to be sealed, that is, in a mold which is able to be closed but is permeable to a fluid heating medium.

As a process for pre-expanding particles of a polyolefin resin, there are, for example, a process disclosed in DE-OS 2,107,683 and a process disclosed in Japanese Examined Patent Publication No. 56-1344.

According to the above processes, in a pressure vessel, particles of the polyolefin resin are dispersed in water, impregnated with a volatile blowing agent and heated to a temperature close to the melting point of the resin particles. Since the polyolefin resin pre-expanded particles are easily fused together or blocking (agglomeration) of the particles easily occurs in the processes, as the blowing agent used, a blowing agent having a relatively small plasticizing property to the polyolefin resin, typically dichlorodifluoromethane (hereinafter referred to as "R-12"), is used. However, when using a blowing agent having a small plasticizing property to the resin, the obtained pre-expanded particles are small in cell diameter, for example, when using R-12, the cell diameter is generally not more than 200 $\mu$m, and it is difficult to control the cell diameter to a desired value. Moreover, the use of R-12 is not preferable because R-12 destroys the ozone layer encompassing the earth.

Japanese Unexamined Patent Publication No. 58-199125), discloses decreasing the diameter of cells by using an inorganic fine powder such as talc or silica, but no technique for increasing the diameter of cells has been disclosed.

When the cell diameter of the pre-expanded particles is too small, it is necessary, prior to molding the pre-expanded particles, to further impart expandability to the pre-expanded particles (Japanese Unexamined Patent Publication No. 59-187086) or to conduct aging under pressure (Japanese Examined Patent Publication No. 60-10017). However, the adoption of such steps is economically disadvantegeous because the required steps are increased, and even if conducting the steps, the allowable range of molding conditions is narrow.

Japanese Examined Patent Publication No. 56-1344 discloses in Example 2 that an industrial butane is used as the blowing agent. However, when using industrial butane as the blowing agent, while the cell diameter of the pre-expanded particles can be made large, it is unavoidable that the pre-expanded particles are fused together or blocking of the pre-expanded particles occurs. Furthermore, since the industrial butane escapes from the obtained pre-expanded particles, the pressure inside the cells decreases during replacement of the intracellular butane gas with air, thus resulting in large shrinkage of the pre-expanded particles.

It is an object of the present invention to eluminate the above-mentioned defects concerning the pre-expanded particles of the polyolefin resin.

Namely, an object of the present invention is to provide a process for preparing polyolefin resin pre-expanded particles which are not fused together or are not agglomerated to each other to form a block, and are large in cell diameter and exhibit less shrinkage.

These and other objects of the present invention will become apparent from the description hereinafter.

SUMMARY OF THE INVENTION

In order to obtain pre-expanded particles which are not fused together or are not agglomerated to each other to form a block, which have small shrinkage even after being allowed to stand or dry and have a large cell diameter and excellent mold processability, the present inventors made an earnest study. As a result, it has been found that an industrial butane which has hitherto been used as the blowing agent is a butane gas distillate in a natural gas and a cracked gas of petroleum, and the butane gas distillate contains normal butane as the main component and other components such as isobutane and a trace amount of propane as the impurities and generally it comprises 80 to 60% by weight of normal butane and 20 to 40% by weight of isobutane. Further, as a result of earnestly repeating study with regard to a composition ratio of normal butane and isobutane in the butane, it has been first found that when a butane containing a specific amount of butane and normal isobutane is used as the blowing agent, surprisingly, the above-mentioned defects are completely eliminated.

In accordance with the present invention, there is provided a process for preparing pre-expanded particles of a polyolefin resin which comprises dispersing polyolefin resin particles in water in a pressure vessel, impregnating the particles with a volatile blowing agent, elevating the temperature of the mixture of the particles and water to a temperature close to the melting point of the resin particles under a pressure equal to or higher than a vapor pressure of the blowing agent and releasing the mixture into a low pressure zone, to thereby expand the particles in which a butane containing not less than 70% by weight of isobutane is used as the volatile blowing agent.

DETAILED DESCRIPTION

The process for preparing the pre-expanded particles of the polyolefin resin of the present invention is, as mentioned above, a quite novel process, and cannot be expected from conventional techniques. That is, when the butane containing a large amount such as not less than 70% by weight of isobutane is used as the blowing agent, there is no trouble such as environmental pollution which is caused when using fluoro chloro carbon, moreover the fusion or blocking of the pre-expanded particles is scarcely caused and the obtained pre-expanded particles have all the advantages of the pre-expanded particles prepared by using fluoro chloro carbon or the industrial butane as the blowing agent.

Examples of the polyolefin resins used in the invention are, for instance, polyethylene resins such as a low density polyethylene, a linear low density polyethylene, a medium density polyethylene, a high density polyethylene, ethylene-vinyl acetate copolymer, homopolypropylene, ethylene-propylene random copolymer, ethylene-propylene block copolymer, ethylene-propylene-butene terpolymer, and the like. They may be used alone or as an admixture thereof. Among the polyolefin resins, the ethylene-propylene random copolymer and the linear low density polyethylene are particularly preferable, since the range of the molding condition is wide when subjecting to molding, using the pre-expanded particles prepared according to the present invention.

Also, the polyolefin resin may contain additives such as an ultraviolet absorber, antistatic agent, heat stabilizer, flame retarder and coloring agent. Further, cross-linked polyolefins prepared by using peroxide or irradiating with electron beam may be used.

According to the present invention, the polyolefin resin pre-expanded particles with uniform cell structure can be prepared by strictly controlling the pressure in the pressure vessel and releasing through small holes, for instance orifices with a diameter of 1 to 10 mm.

The polyolefin resin particles may contain an inorganic nucleating agent, as occasion demands. The amount of the inorganic nucleating agent is preferably from 0.005 to 5 parts by weight, more preferably from 0.005 to 1 part by weight, especially from 0.01 to 0.5 part by weight based on 100 parts by weight of the resin particles. The inorganic nucleating agent functions in the resin particles so as to provide pre-expanded particles with a uniform cell diameter of 50 to 1000 μm.

When the amount of the inorganic nucleating agent is less than 0.005 part by weight, it is difficult to obtain the pre-expanded particles with uniform cells. On the other hand, when the amount of the nucleating agent is more than 5 parts by weight, the cell diameter is too small.

Examples of the inorganic nucleating agent are, for instance, talc, silica, calcium silicate, calcium carbonate, aluminum chloride, titanium oxide, diatomaceous earth, clay, kaolin, sodium hydrogencarbonate, barium sulfate, bentonite, and the like. Among them, talc and silica are preferably used.

The particle size of the polyolefin resin particles is preferably from 0.25 to 10 mm, more preferably from 0.5 to 6 mm.

In the present invention, as the blowing agent, a butane containing not less than 70% by weight of isobutane is used, as mentioned above. When using such a butane, the dispersion stability of the polyolefin resin particles in water is excellent even under high temperature and high pressure conditions, so the pre-expanded particles are not fused together or do not adhered to each other.

When the amount of isobutane in the butane is less than 70% by weight, the pre-expanded particles are shrinked. When the pre-expanded particles are allowed to stand in the air, the butane, which is contained in the pre-expanded particles in a large amount just after pre-expansion, escapes from the pre-expanded particles with invading air into the particles. Since normal butane is larger in gas permeability to the polyolefin resin than isobutane, in case of the using a butane containing relatively much normal butane such as the butane containing less than 70% by weight of isobutane as above-mentioned, the butane completely escapes before enough air has invaded the particles thereby decreasing the internal pressure of the pre-expanded particles, this results in shrinkage of the pre-expanded particles.

The preferable amount of isobutane in the butane is from 85 to 98% by weight.

The butane containing not less than 70% by weight of isobutane can give as excellent dispersion stability as pure isobutane. Considering the purification cost of isobutane, it is preferable that the butane contains not more than 98% by weight of isobutane.

The butane used as the blowing agent in the invention may contain another component, normal butane, so long as the isobutane content is not less than 70% by weight.

The blowing agent is generally incorporated in an amount of 5 to 40 parts by weight per 100 parts by weight of the polyolefin resin. The amount of the volatile blowing agent used is decided so that the content of the blowing agent in the resin falls within the above range, with giving consideration to the kind of the blowing agent, desired expansion ratio, ratio of the volume of resin to the volume of space in a pressure vessel, etc.

In the present invention, it is preferable that a dispersing agent is used in a small amount upon dispersing the polyolefin resin particles in water to prevent the resin particles from fusing to each other by heating. Examples of the dispersing agent are, for instance, a water-soluble polymer such as polyvinyl alcohol, methyl cellulose or poly-N-vinyl pyrrolidone, and a powder of a water-insoluble or slightly water-soluble inorganic material such as calcium phosphate, magnesium pyrophosphate or zinc carbonate, a mixture of the inorganic powder as above and a slight amount of an anionic surface active agent as a dispersing assistant, e.g. sodium alkylbenzenesulfonate, sodium α-olefinsulfonate or sodium alkylsulfonate. It is preferable to use the inorganic substance, because the use of the water-soluble polymer causes water pollution. However, when using a large amount of the inorganic substance, the obtained pre-expanded particles are well fused together on heating for molding. In that case, the amount of the inorganic powder and the anionic surface active agent are from 0.1 to 5 parts by weight and 0.001 to 0.5 part by weight, respectively, per 100 parts by weight of the resin particles.

In the present invention, the mixture of the polyolefin resin and the blowing agent is heated at a temperature close to the melting point of the polyolefin resin.

The heating temperature varies depending on the kinds of the polyolefin resin and volatile blowing agent and the desired expansion ratio, and preferably is within the range of $-25°$ to $+10°$ C., more preferably $-20°$ to $+5°$ C., of the melting point of the polyolefin resin. For example, in case of using an ethylene-propylene random copolymer with a melting point of 135° C., it is preferable that the heating temperature is selected from 110° to 145° C. When the heating temperature is lower than the above range, there is a tendency that the expansion ratio is remarkably lowered, and when the heating temperature is higher than the above range, there is a tendency that the number of closed cells in the pre-expanded particles is decreased.

The volatile blowing agent can be impregnated in the polyolefin resin particles in a usual manner, for example, by agitating the dispersion in the pressure vessel within the above temperature range, thereby bringing the resin particles into contact with the blowing agent. At that time, the pressure in the vessel is maintained at a pressure equal to or higher than the vapor pressure that the volatile blowing agent indicates.

The thus obtained mixture of water and the polyolefin resin particles is released from the vessel, for instance, by opening a part provided at the bottom of the vessel, to an atmosphere of lower pressure than the pressure in the vessel (generally, atmospheric pressure), thus the pre-expanded particles of the polyolefin resin having a large average cell diameter are obtained. During releasing, the volume of the space in the pressure vessel becomes large with decrease of the mixture in the vessel, accordingly the partial pressure of the volatile blowing agent lowers to lower the expansion ratio of the pre-expanded particles. Then, by introducing the blowing agent into the vessel under pressure in the state of liquid or gas, the pressure in the vessel is kept constant, whereby it can be prevented that the expansion ratio is lowered or varies.

The expansion ratio of the polyolefin pre-expanded particles varies depending on purposes, density of the polyolefin resin used, and the like. Preferably, the expansion ratio is from 5 to 60.

As to the pre-expanded particles with the large average cell diameter there is an effect that since the cell film is thick, the air in the cell escapes less by heating in molding, thereby preventing shrinkage of the molded article due to decrease of the pressure in the cell.

The pre-expanded particles of the polyolefin resin are molded as follows:

For example, immediately after preparing the pre-expanded particles, or after aging the obtained pre-expanded particles for an appropriate period of time and drying, and if necessary, imparting the expandability to the pre-expanded particles prior to molding or aging the pre-expanded particles under pressure, the pre-expanded particles are charged in a mold which is able to be closed but is unable to be sealed, and are heated with steam as a heating medium at a temperature of about 105° to about 140° C. for about 3 seconds to about 2 minutes, thereby forming to give a molded article.

Since the pre-expanded particles prepared by the process of the present invention are, as mentioned above, large in average cell diameter and the molded article therefrom is less shrinked, they can be molded as the pressure in the cell is kept at atmospheric pressure, without imparting an expandability to the pre-expanded particles prior to molding or without aging the pre-expanded particles under pressure. For example, pre-expanded particles of a linear low density polyethylene with an average cell diameter of not less than 200 μm can be molded without imparting the expandability thereto. In such a case, the pre-expanded particles may be aged under pressure as occasion demands.

The pre-expanded particles obtained according to the process of the present invention have a wide range in heating condition for molding in a mold and can be easily molded, further, the molded article therefrom is small in shrinkage and excellent in smoothness of its surface without "shrinkage or depression" or "camber", and molded article in which the particles are strongly adhered and welded to each other can be obtained.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLES 1-3 AND COMPARATIVE EXAMPLES 1-3

A 4 l pressure vessel was charged with 100 parts of pellets (weight: about 1.3 mg/pellet) of an ethylene-propylene random copolymer (commercially available under the trade mark "Nolben" from Sumitomo Kagaku Kogyo Kabushiki Kaisha, ethylene content: 4.5% by weight, melting point (MT) measured by using a differential scanning calorimeter (DSC): 13.5° C., melt flow index (MI): 8 g/10 mi. and 0.01 part, based on parts of the ethylene-propylene random copolymer pellets, of talc, 18 to 21 parts of a butane having a composition ratio shown in Table 1 as a blowing agent, 3.0 parts of basic calcium tertiary phosphate powder as a dispersing agent, 0.12 part of sodium n-paraffinicsulfonate and 300 parts of water, and the temperature of the mixture was raised to 131.5° C. At that time, the inner pressure was about 18 to 22 kg/cm$^2$-G(gauge pressure).

After maintaining the dispersion as it was in the vessel for 30 minutes, a valve provided at a lower part of the vessel was opened to release the aqueous dispersion into the atmospheric pressure through an orifice having an inner diameter of 4 mm in an orifice plate. During the release the inner pressure of the vessel was maintained at 18 to 22 kg/cm$^2$-G by supplying the butane under pressure to the vessel.

The obtained pre-expanded particles had an average cell diameter of 250 to 280 μm.

The average cell diameter of the obtained pre-expanded particles became large with increase of the amount of isobutane in the butane used as the blowing agent, but there was no great difference.

The expansion temperature and pressure were decided so that the expansion ratio of the any of dried pre-expanded particle obtained in Examples 1-3 and Comparative Examples 1-3 was almost the same.

The pre-expanded particles were dried at 60° C. for 24 hours, then, the total amount of the pre-expanded particles and the amount of the particles fused together were measured. The blocking ratio was calculated as follows:

$$\text{Blocking ratio (\%)} = \frac{\text{The weight of the pre-expanded particles fused together}}{\text{Total weight of the pre-expanded particles}} \times 100$$

The results are shown in Table 1.

TABLE 1

| | Butane | | Expansion condition | | | |
| | Composition | | | | | |
| Ex. No. | (isobutane/normal butane) weight ratio | Amount (part) | Temperature (C.°) | Inner pressure (kg/cm$^2$-G) | Expansion ratio after drying | Blocking ratio (%) |
|---|---|---|---|---|---|---|
| Ex. 1 | 95/5 | 18.5 | 131.5 | 21.7 | 32.5 | 1 |
| Ex. 2 | 85/15 | 18.7 | 131.5 | 20.5 | 32.0 | 1 |
| Ex. 3 | 70/30 | 19.0 | 130.0 | 20.1 | 32.8 | 3 |
| Com. Ex. 1 | 60/40 | 19.0 | 129.5 | 19.0 | 32.3 | 12 |
| Com. Ex. 2 | 40/60 | 19.5 | 129.5 | 19.0 | 32.8 | 16 |
| Com. Ex. 3 | 5/95 | 20.0 | 129.0 | 18.7 | 32.3 | 23 |

From the results as shown in Table 1, it would be recognized that when using the butane containing less than 70% of isobutane as the blowing agent, the blocking ratio is suddenly increased, so the obtained pre-expanded particles cannot be substantially used.

EXAMPLES 4-6 AND COMPARATIVE EXAMPLES 4-6

A 4 l pressure vessel was charged with 100 parts of pellets (weight: about 4.5 mg/pellet) of a linear low density polyethylene (commercially available under the trade mark "G-Resin 7047" from Union Carbide Corp., comonomer: 1-butene, resin density: 0.918 g/cm$^3$, MT: 121° C., MI: 1.0 g/10 min.) and 0.02 part, based on 100 parts of the polyethylene pellets, of talc, 19 to 22 parts of a butane having a composition ratio shown in Table 2 as a blowing agent, 1.2 parts of basic calcium tertiary phosphate powder as a dispersing agent, 0.006 part of sodium n-paraffinicsulfonate and 300 parts of water, and the temperature of the mixture was raised to 114° C. At that time, the inner pressure was about 16 to 19 kg/cm$^2$G.

After maintaining the dispersion as it was in the vessel for 30 minutes, a valve provided at a lower part of the vessel was opened to release the aqueous dispersion into the atmospheric pressure through an orifice having an inner diameter of 4 mm in an orifice plate. During the release the inner pressure of the vessel was maintained at 16 to 19 kg/cm$^2$G by supplying the butane under pressure to vessel.

The obtained pre-expanded particles had an average cell diameter of 220 to 260 μm.

The average cell diameter of the obtained pre-expanded particles became large with increase of the amount of isobutane in the butane used as the blowing agent, but there was no great difference, similarly to results in Examples 1-3.

After drying the pre-expanded particles at 40° C. for 24 hours, the blocking ratio was calculated in the same manner as in Example 1.

The results are shown in Table 2.

butane used as the blowing agent is less than 70% by weight, the blocking ratio is remarkably increased.

According to the present invention, the obtained pre-expanded particles of the polyolefin resin are not fused together and are not adhered to each other, and are not shrunken. Also, since fluorochlorocarbon is not used as the blowing agent, environmental damage such as destruction of the ozone layer encompassing the earth is avoided.

In addition to the ingredients used in the Examples, other ingredients can be used in the Examples as set forth in the specification to obtain substantially the same results.

What we claim is:

1. In a process for preparing pre-expanded particles of a polyolefin resin which comprises dispersing polyolefin resin particles in water in a pressure vessel, impregnating the particles with a volatile blowing agent, elevating the temperature of the mixture of the particles and water to a temperature close to the melting point of the resin particles under a pressure equal to or higher than a vapor pressure of the blowing agent and releasing the mixture into a low pressure zone, the improvement which comprises using a butane containing not less than 70% by weight and not more than 98% by weight of isobutane as the blowing agent.

2. The process of claim 1, wherein said polyolefin resin is an ethylene-propylene random copolymer or a linear low density polyethylene.

3. The process of claim 1, wherein said butane contains 85 to 98% by weight of isobutane.

4. The process of claim 1, wherein the temperature is elevated to a temperature within the range of −25° C. to +10° C. of the melting point of the polyolefin resin.

5. The process of claim 1, wherein the butane contains 70% by weight to 95% by weight of isobutane and 30% by weight to 5% by weight of normal butane.

TABLE 2

| Ex. No. | Butane Composition (isobutane/normal butane) weight ratio | Amount (part) | Expansion condition Temperature (C.°) | Inner pressure (kg/cm$^2$ G) | Expansion ratio after drying | Blocking ratio (%) |
|---|---|---|---|---|---|---|
| Ex. 4 | 95/5 | 18.5 | 113.8 | 18.5 | 22.8 | 0 |
| Ex. 5 | 85/15 | 18.7 | 113.8 | 18.0 | 22.5 | 0 |
| Ex. 6 | 70/30 | 19.0 | 113.8 | 17.3 | 23.0 | 1 |
| Com. Ex. 4 | 60/40 | 19.0 | 113.5 | 16.7 | 22.0 | 7 |
| Com. Ex. 5 | 40/60 | 19.5 | 113.3 | 16.3 | 21.5 | 9 |
| Com. Ex. 6 | 5/95 | 20.0 | 113.0 | 15.0 | 21.3 | 13 |

From the results as shown in Table 2, it would be recognized that when using the isobutane content in the

* * * * *